(12) United States Patent
Kim (10) Patent No.: US 7,972,077 B2
(45) Date of Patent: Jul. 5, 2011

(54) CONNECTOR FOR LINEAR MEMBERS

(75) Inventor: Myoung-su Kim, Inchon (KR)

(73) Assignee: Myoung-su Kim, Inchon (KR)

( * ) Notice: Subject to any disclaimer, the term of this patent is extended or adjusted under 35 U.S.C. 154(b) by 0 days.

(21) Appl. No.: 12/557,059

(22) Filed: Sep. 10, 2009

(65) Prior Publication Data

US 2010/0067978 A1    Mar. 18, 2010

(30) Foreign Application Priority Data

Sep. 11, 2008 (KR) .................. 10-2008-0089624

(51) Int. Cl.
 *F16D 1/12* (2006.01)
(52) U.S. Cl. ............ 403/64; 403/82; 403/174; 403/178; 403/218; 403/375
(58) Field of Classification Search .............. 403/64–73, 403/75, 80, 82, 116, 117, 119, 161–165, 403/169, 170, 174, 175, 178, 217, 218, 233, 403/252, 255, 264, 361, 375; 256/67; 52/81.3
See application file for complete search history.

(56) References Cited

U.S. PATENT DOCUMENTS

| | | | | |
|---|---|---|---|---|
| 1,110,183 | A * | 9/1914 | Bonham | 403/187 |
| 1,316,155 | A * | 9/1919 | Harrison | 256/67 |
| 1,579,159 | A * | 3/1926 | Spikings | 403/64 |
| 2,212,455 | A * | 8/1940 | Reed | 403/64 |
| 2,682,235 | A * | 6/1954 | Fuller | 52/81.3 |
| 3,192,669 | A * | 7/1965 | Hawkins | 52/81.3 |
| 6,698,725 | B1 * | 3/2004 | Berry | 256/65.01 |

* cited by examiner

*Primary Examiner* — Victor Macarthur
(74) *Attorney, Agent, or Firm* — Occhiuti Rohlicek & Tsao LLP (57) ABSTRACT

Connectors for linear members of wall structure which allows a variety of guide rails, fences, and pipes to be assembled in a desired pattern conveniently are provided. The connector includes a central body of annular shape; at least one socket member 6, the one end of the socket member being connected to the central body and the other end being connected to the linear member, such as pipe, wire or bar; and a rail means that connects the central body and the socket member such that the socket member can be moved along the circumferential surface of the central body.

1 Claim, 8 Drawing Sheets

CONNECTOR FOR LINEAR MEMBERS

CROSS-REFERENCE TO RELATED APPLICATIONS

This application claims priority to Korean Application No. 10-2008-0089624, filed on Sep. 11, 2008; the content of which is hereby incorporated by reference in its entirety.

FIELD OF THE INVENTION

The present invention relates to a connector, more specifically, a connector for linear members of wall structure which allows a variety of guide rails, fences, and pipes to be conveniently assembled in a desired pattern.

BACKGROUND OF THE INVENTION

Wall structures used for guard rails of stairs, guide rails for discriminating between a roadway and a footway, and fences for representing boundaries of land generally have posts that are vertically positioned at a distance and blocking members between the posts. Especially, lattices made by linear members, for example, bars and pipes, etc. are usually used.

Recently, many of self-governing bodies use wall structures which are designed to present a fine sight or to represent symbols of the bodies. Accordingly, there are continuous efforts to provide a variety of designs onto the wall structures. In addition, one must consider a functionality and an utility as well as a sense of beauty.

Guide rails of prior art generally includes vertical pipes anchored to the ground by anchor bolts, transverse pipes, and elongated pipes spanning between the vertical pipes and the transverse pipes. The pipes are connected, for example, by welding methods to construct the guide rails. In that case, the pipes are cut in a predetermined length and a predetermined cutting angle and then welded each other. This is a time-consuming work and limits the design of the guide rails. The inventor of the present invention had developed a improved pipe thread for guide rail to address the problems, which is pending as a Korean Patent Application no. 10-2004-0079751.

Figure 1:
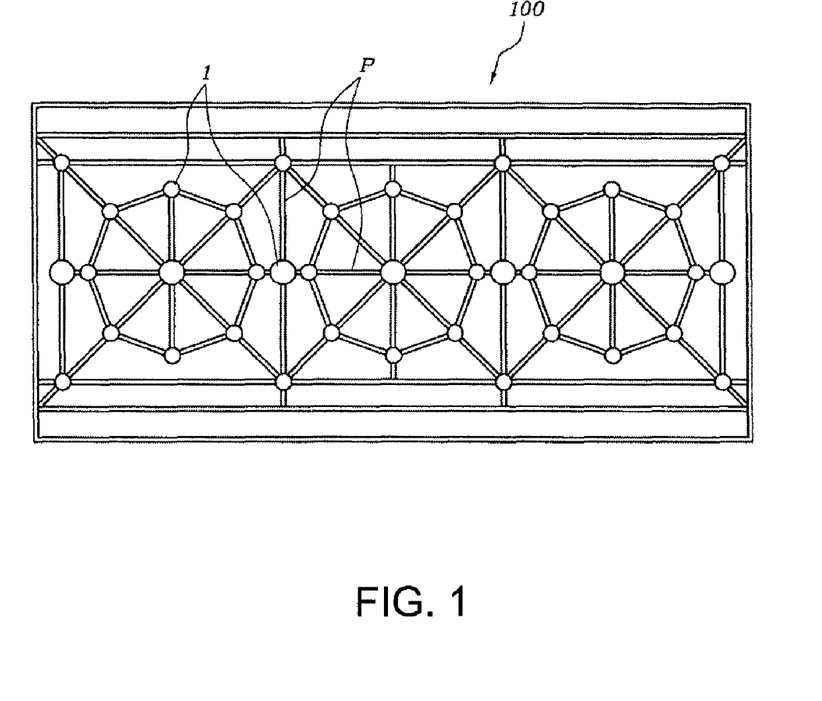
FIG. 1 is a front view of a guide rail constructed by connectors of the present invention.

A front view of the guide rail 100 according to above Korean Patent Application is shown in FIG. 1. In the drawings, pipes P are connected radially to the Connectors 1. One end of the pipe is connected to the connector 1 and the other end is connected to a frame, for example, a post. The present invention is to improve the connector 1 shown FIG. 1.

The object of the invention is thus to provide a improved connector for linear members of wall structure, which makes it possible to connect the linear members and then construct wall structures, such as guard rails, fences and guide rails, etc. in a simple manner. Another object of the invention is to provide a simple and slim connector for linear members.

SUMMARY OF THE INVENTION

To achieve the above objects, the connector in accordance with the present invention includes:

a central body of annular shape; at least one socket member, one end of the socket member being connected to the central body and the other end being connected to a linear member, such as a pipe, a wire or a bar; and a rail means that connects the central body and the socket member such that the socket member can be moved along the circumferential surface of the central body.

According to one aspect of the invention, the central body comprises a cylinder member; the rail means comprises at least one annular, L-shape guide groove, and at least one latch to engage the guide groove and to prevent the socket member from disengaging therefrom. Cover members having a circular disc and a rim, respectively, are fitted onto the opposite sides of the cylinder member such that at least one guide groove is concealed According to the present invention, wall structures are easily constructed by assembling a plurality of linear members including pipes and bars in various patterns. Also, the connector according to the present invention has a simple structure, and thus the present invention can achieve lower costs.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and therefore, are not to be considered limiting of its scope, for the invention may admit to other equally effective embodiments.

DETAILED DESCRIPTION OF THE INVENTION

Figure 2:
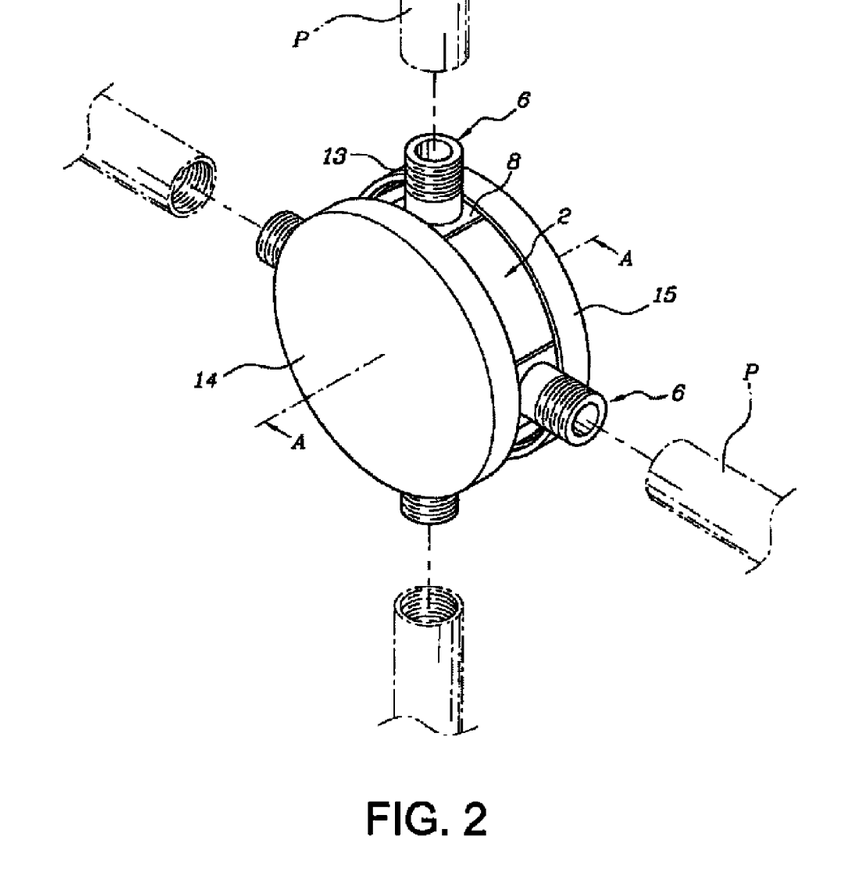
FIG. 2 is a perspective view of a connector according to a first embodiment of the present invention.
Figure 3:
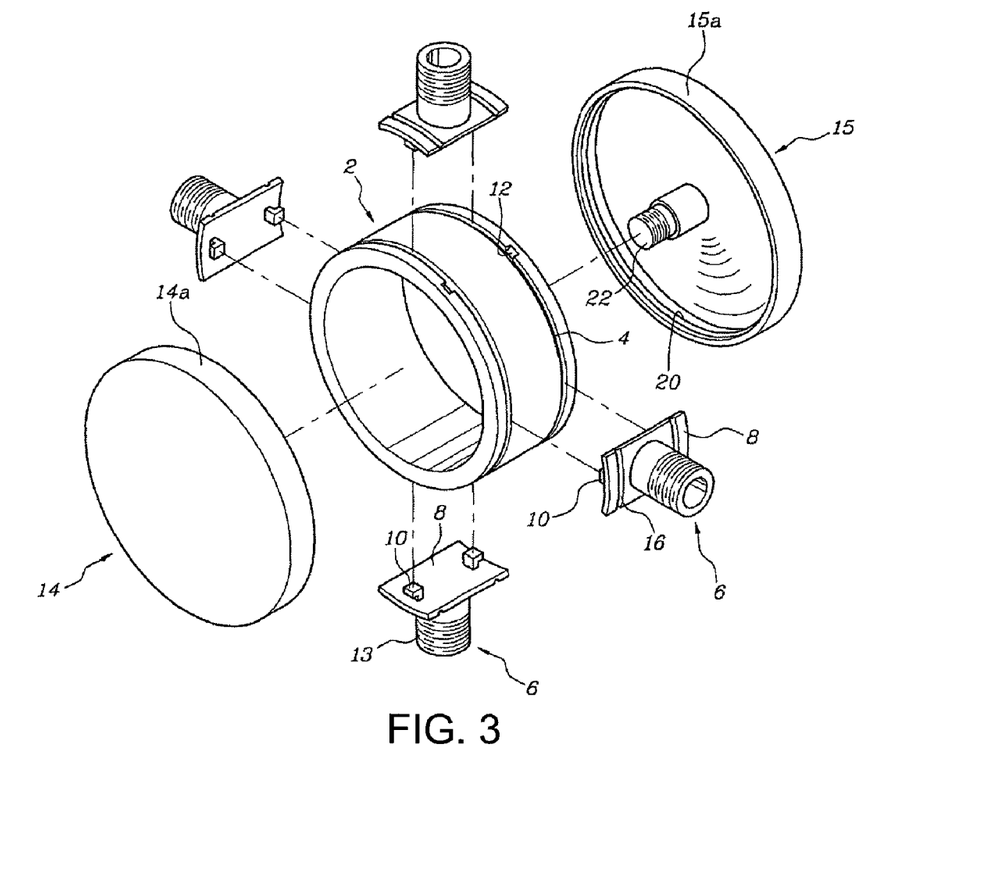
FIG. 3 is a exploded view of the connector shown in FIG. 2.
Figure 4A:
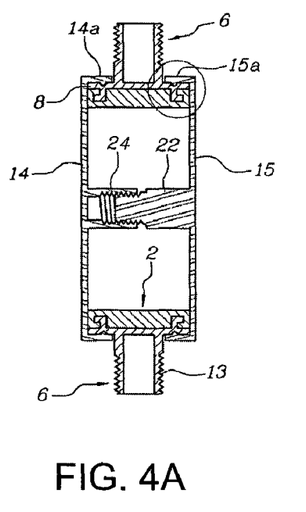
FIGS. 4A and 4B are cross-sectional views of the connector taken from the line A-A in FIG. 2.
Figure 4B:
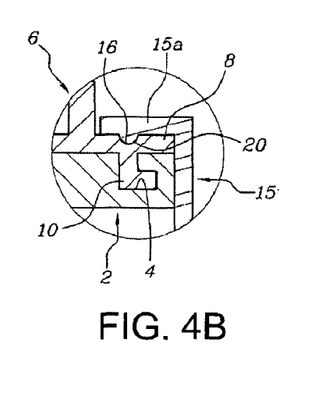
Figure 5:
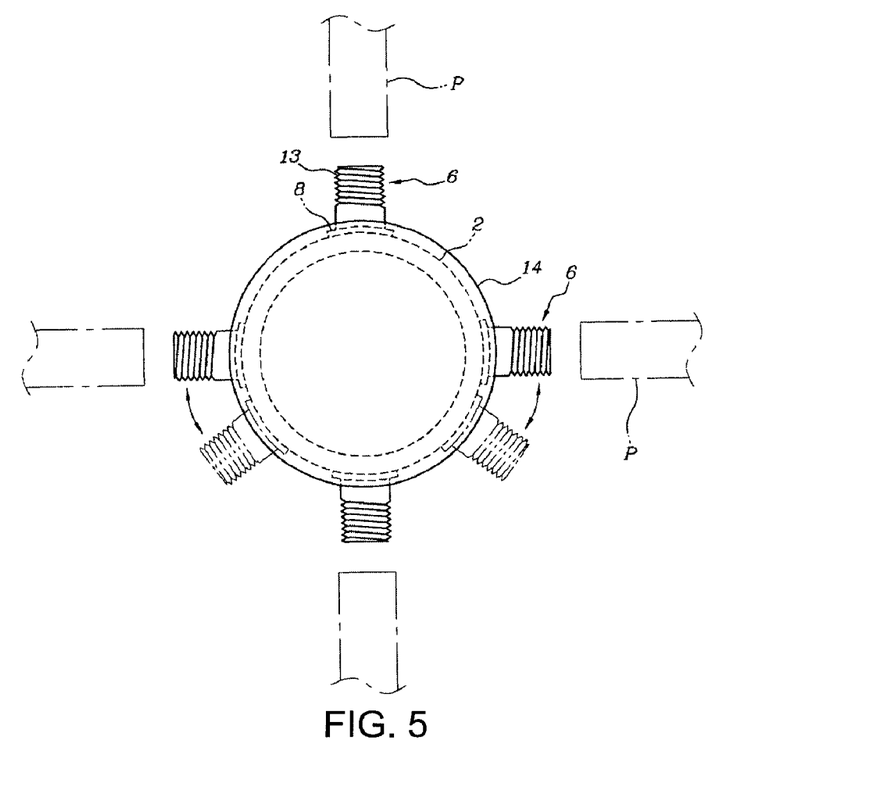
FIG. 5 is a front view of the connector shown in FIG. 2.
Figure 6A:
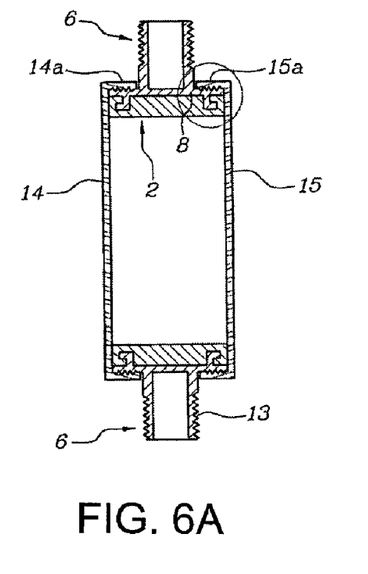
FIGS. 6A and 6B are cross-sectional views of a connector according to a second embodiment of the present invention.
Figure 6B:
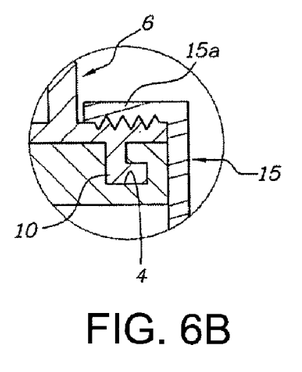
Figure 7A:
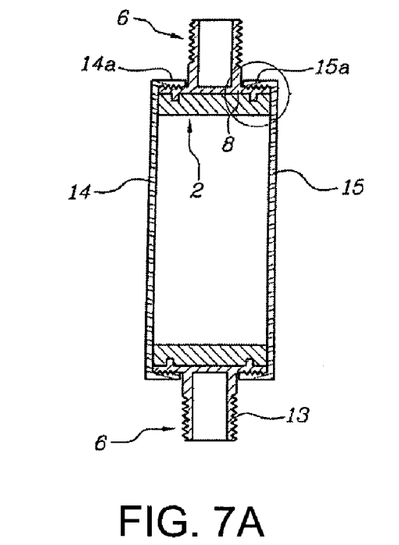
FIGS. 7A, 7B, 8A and 8B are cross-section views of the connectors according to a third and a forth embodiments of the present invention.
Figure 7B:
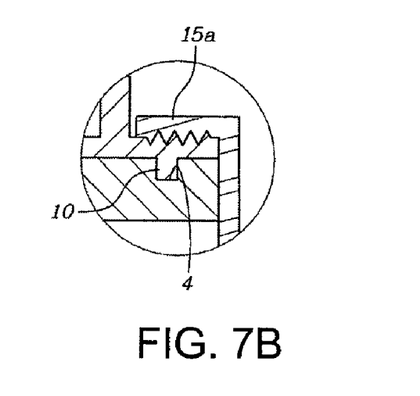

FIG. 1 is a front view of a guide rail constructed by the connectors of the present invention. FIG. 2 is a perspective view of a connector according to a first embodiment of the present invention. FIG. 3 is an exploded view of the connector shown in FIG. 2. FIGS. 4A and 4B are cross-sectional views of the connector taken from the line A-A in FIG. 2. FIG. 5 is a front view of the connector shown in FIG. 2. FIGS. 6A and 6B are cross-sectional views of a connector according to a second embodiment of the present invention. FIGS. 7A, 7B, 8A and 8B are cross-section views of the connectors according to a third and a forth embodiments of the present inventions. FIG. 9 is a front view of the connector according to another embodiment of the present invention. The connectors of the present invention are used in same applications as the connector 1 shown in FIG. 1.

A plurality of linear members are radially connected to the central body of annular shape. At least one socket member is located between the central body and the linear member. One end of the socket member is connected to the central body and extends out radially, and the other end of the socket member is connected to the linear members such as pipes, wires and bars. The rail means is located at the connection between the central body and the socket member so that the socket member moves along the circumferential surface of the central body with one end of the socket member being connected to the central body. The rail means may be installed in various ways. As noted, the central body and the rail means can be modified within the scope of the present invention.

Referring to FIGS. 2 to 5, one embodiment of the present invention is described.

In one embodiment, a cylinder member 2 is used as the central body. Two L-shaped guide grooves 4 and latches 10 engaging the guide grooves are used as the rail means.

The cylinder member 2 having a constant width includes two guide grooves 4 along the circumferential surface. The cylinder member 2 can be made as an unitary piece or made by two or more pieces. Referring to the FIG. 2, the cylinder member 2 has a ring shape with a thickness of 1 to 4 cm, and two L-shaped guide grooves 4 are symmetrically provided on the cylinder member 2.

Provided at one end of the socket member 6 is a flange 8. Latches 10 also are provided on the flange 8 such that the flange 8 can be moved along the guide grooves 4. Once the latches 10 engage with the guide grooves 4, the socket member 6 can not move away radially, but can rotate along the circumferential edges of the cylinder member 2. The flange 8 of the socket member 6 has a curved shape that corresponds to the curvature of the cylinder member 2.

According to one embodiment of the invention, a slot 12 for inserting the latch 10 is provided on the surface of the cylinder member 2. The slot is preferably closed after the required numbers of the latches 10 are inserted. Alternatively, the slot 12 remains open, in this case, the socket member is preferably positioned at a distances from the slot.

Linear members are connected to the other end of the socket member 6. For this, a thread 13 is provided on the other end of the socket member 6. As described above, the linear member may comprise bar, wire, and pipe etc. In the drawings, linear members are shown as pipes P, and the linear members are referred to as pipes P below.

Similar to the conventional plumbing methods, the socket member 6 and the pipe P may be joined by threads. For this connection, there is provided, for example, a male thread on the other end of the socket member 6 and a female thread on the inside of the pipe P. In addition to the threads, other connecting means, such as rivets and welds can be employed.

One or more socket members 6 can be mounted onto the cylinder member 2 and all of the socket members 6 need not to have a same shape. As shown in FIG. 9, one of the socket members 6 can be connected to a post C of the wall structure. In this case, a bracket 11 can be provided at the other end of socket member 6.

Cover members 14, 15 are fitted onto the opposite sides of the cylinder member 2. As shown in the drawings, the cover members 14, 15 can be fitted on by hooks. Specifically, rims 14a, 15a of the cover members 14, 15 are joined such that the the rims cover over the flanges 8 of the socket members 6 and conceal the guide grooves 4. Recesses 16 are provided on the flange 8 of the socket members and protrusions 20 are provided on the underside of the cover members 14, 15. The protrusions 20 engage with the recesses 16.

Cover members 14, 15 are joined together by a center bolt 22 and a center nut 24 to prevent the cover members 14, 15 and the cylinder member 2 from disengaging. The center bolt 22 and the center nut 24 can be molded integrally with each of the cover members 14, 15. Alternatively, the cover members 14, 15 can be joined by hooks other than the bolt-nut joining means.

According to another embodiment of the invention, as shown in FIGS. 6A and 6B, the cover members 14, 15 may be engaged with the socket members 6 by threads. For this, for example, a male screw is provided on the top surface of the socket member 6 and a female screw is provided on the inside of the rims 14a, 15a of the cover members 14, 15. According to this embodiment, components, for example, the center bolt 22 (see FIG. 4) of above embodiment are not needed any more.

Connectors for linear members according to another embodiments are described below. FIGS. 7A, 7B, 8A and 8B are cross-sectional views of the connectors according to the embodiments of the invention. In these embodiments, the central body is the cylinder member 2 and cover members 14, 15 with rims on the edges thereof are fitted onto the opposite sides of the cylinder member 2.

The rail means are formed by the circumferential surface of the cylinder member 2 and the rims 14a, 15a of the cover members. The circumferential surface is provided with two guide grooves 4 and two latches 10 formed at one end of the socket member 6 are engaged with the guide grooves 4.

According to this embodiment, generally L-shaped guides are formed by assembling the cover members 14, 15 and the socket members 6. The socket members 6 can not moved away radially by the L-shaped guides formed between the cover members 14, 15 and the socket members 6. As a result, unlikely the above embodiments, the cover members 14, 15 may be essential constitutions of the rail means in this embodiment.

Figure 8A:
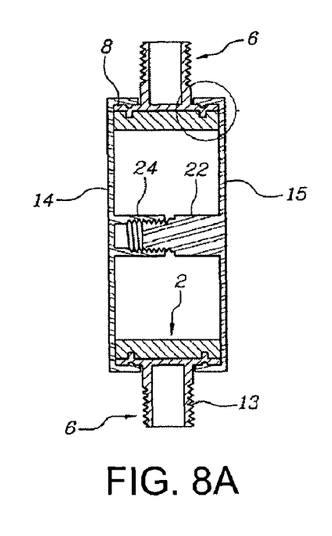
Figure 8B:
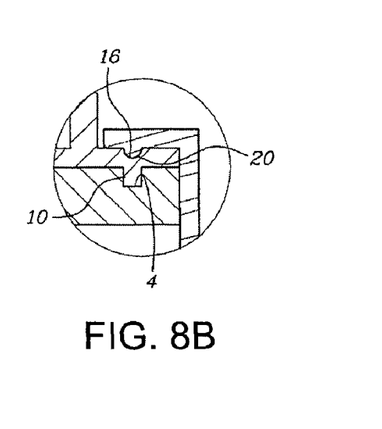
Figure 9:
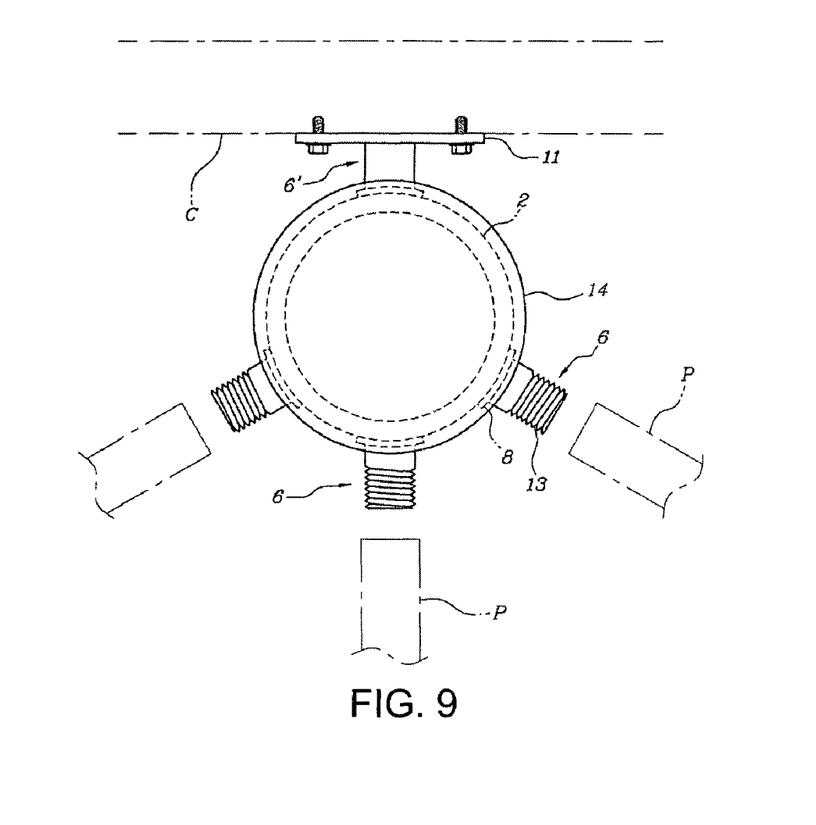
FIG. 9 is a front view of the connector according to another embodiment of the present invention.

Referring to FIGS. 8A and 8B, the cover members 14, 15 are engaged with each other by a center bolt 22 and a center nut 24. Alternatively in the embodiment shown in FIG. 7, the cover members 14, 15 and the socket members 6 may be joined each other by threads. In this case, means for joining the cover members 14, 15 each other is not needed.

Referring to FIGS. 8A and 8B, the cover members 14, 15 and the socket members 6 are snap-fitted by protrusions 20 and recesses 16 and the cover members 14, 15 are engaged with each other by a center bolt 22 and a center nut 24.

Figure 10A:
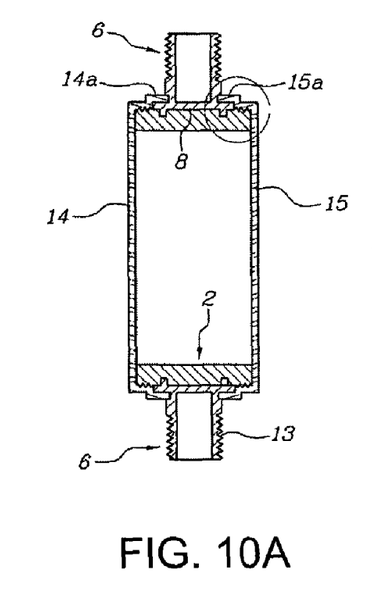
FIGS. 10A and 10 are cross-sectional views of a connector according to a fifth embodiment of the present invention.
Figure 10B:
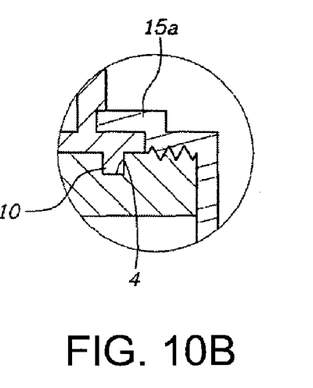

FIGS. 10A and 10B are cross-sectional views of a connector according to yet another embodiment of the present invention. In this embodiment, the cover members 14, 15 and the cylinder member 2 are joined together by threads. Guides formed by assembling the cover members 14, 15 and the socket members 6 are used as rail means. The guides prevent the socket members 6 from moving away from the cylinder member 2 radially. In this embodiment, like the above embodiments, the central body is embodied as the cylinder member 2 and the cover members 14, 15 and the rail means are embodied as the guides that are formed by joining the cylinder member 2 and the cover members 14, 15.

In the embodiments, while the cylinder members 2 are described and shown as a cylindrical shape, the present invention is not limited to this shape. Instead, the cylinder members 2 can have any shapes including an oval shape, or a polygon shape with round edges.

Figure 11:
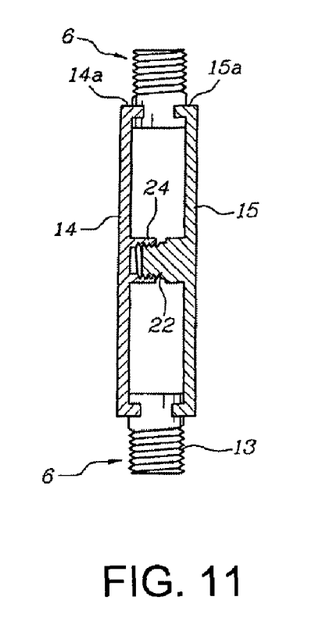
FIG. 11 is a cross-sectional view of a connector according to a sixth embodiment of the present invention.
Figure 12:
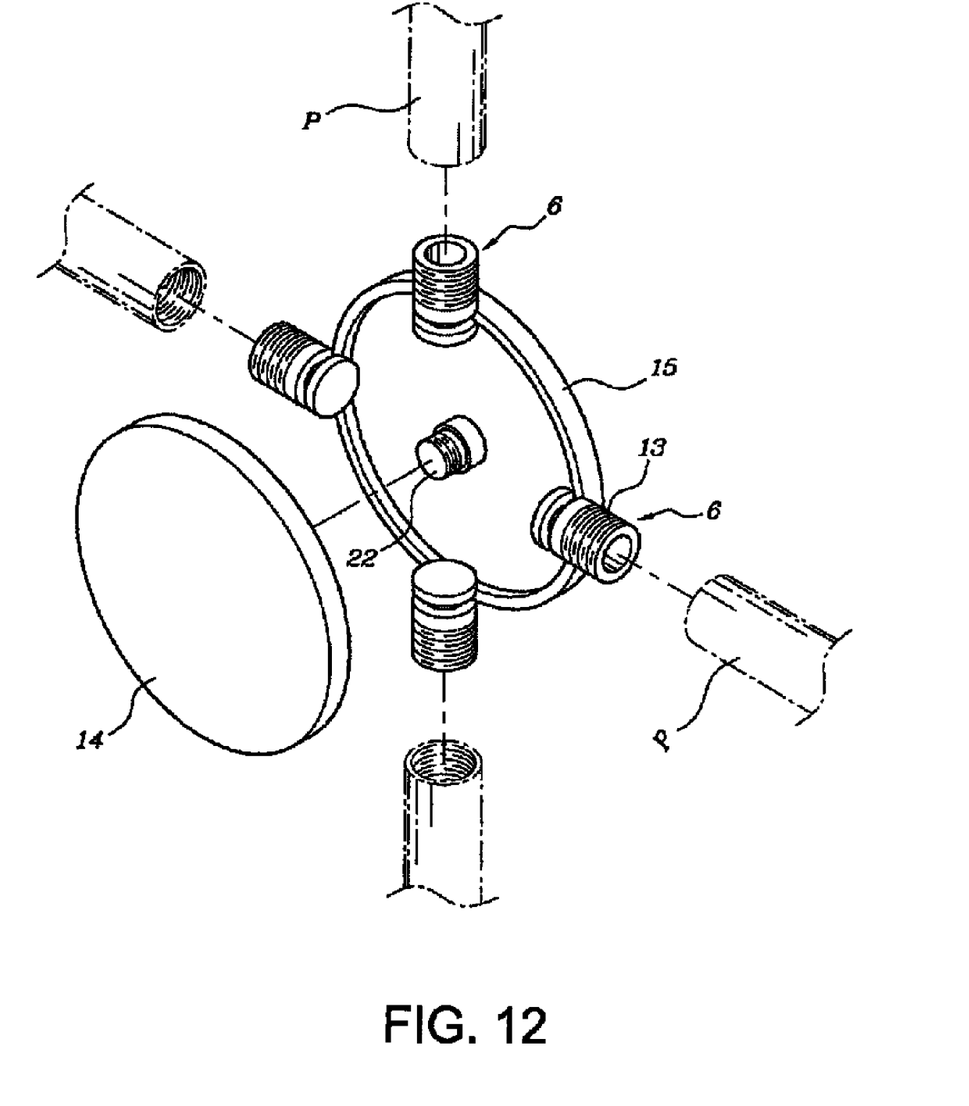
FIG. 12 is a exploded view of the connector shown in FIG. 11.

FIG. 11 is a cross-sectional view of a connector according to yet another embodiment of the present invention and FIG. 12 is a exploded view of the connector shown in FIG. 11. In this embodiment, unlikely the above embodiments, the cylinder members 2 (see FIGS. 2 to 10) are omitted. In this embodiment, only cover members 14, 15 are used as central body. In addition, the rail means are formed by the rims 14*a*, 15*a* of the cover members 14, 15 and a guide groove located around the socket member 6. The cover members 14, 15 are joined together by the center bolt 22 and the center nut 24.

Connectors for linear members are assembled to a frame for a plastic greenhouse or a glasshouse by mounting the socket members 6 to the cylinder members 2, installing the cylinder members 2 to posts, screwing elongate pipes used as rafters to the socket members 6, and positioning the cylinder members 2 at vertices of a triangle such that the elongate pipes are sides of the triangle.

What is claimed is:

1. A connector for linear members of wall structure, wherein the connector comprises a cylinder member having two annular, guide grooves at opposite L-shape circumferential edges of the cylinder member, and socket members, wherein each of the guide grooves has a constant width and a slot formed therein, the socket members comprise a flange having two latches at one side thereof and a thread at the other side, the latches are inserted through the slots to engage with and slide along the guide grooves, the connector characterized in that:

cover members having a circular disc and a rim, respectively, are fitted onto the opposite sides of the cylinder member such that all of the guide grooves of the cylinder member and at least a portion of the flange of the socket members are covered, and a center bolt and a center nut are formed at the opposite inner sides of the cover members so that the cylinder member, the socket members and the cover members are assembled or released by engaging or disengaging the center bolt and the center nut.

\* \* \* \* \*